US012186244B2

(12) United States Patent
Wolf

(10) Patent No.: US 12,186,244 B2
(45) Date of Patent: Jan. 7, 2025

(54) SHOCK ABSORBING APPARATUS

(71) Applicant: INVENTIT LTD., Kfar Maimon (IL)

(72) Inventor: Gilad Wolf, Kfar Maimon (IL)

(73) Assignee: INVENTIT LTD., Kfar Maimon (IL)

( * ) Notice: Subject to any disclaimer, the term of this patent is extended or adjusted under 35 U.S.C. 154(b) by 429 days.

(21) Appl. No.: 17/606,696

(22) PCT Filed: Apr. 30, 2020

(86) PCT No.: PCT/IL2020/050489
§ 371 (c)(1),
(2) Date: Oct. 26, 2021

(87) PCT Pub. No.: WO2020/225809
PCT Pub. Date: Nov. 12, 2020

(65) Prior Publication Data

US 2022/0273506 A1 Sep. 1, 2022

Related U.S. Application Data

(60) Provisional application No. 62/842,577, filed on May 3, 2019.

(51) Int. Cl.
*A61G 3/00* (2006.01)

(52) U.S. Cl.
CPC .................................... *A61G 3/006* (2013.01)

(58) Field of Classification Search
CPC ... E05F 1/1091; E05F 3/10; E05F 3/12; E05F 15/622; F16F 9/56; F16F 9/0209; F16F 9/19; F16F 9/483; E05Y 2800/242; E05Y 2900/548
See application file for complete search history.

(56) References Cited

U.S. PATENT DOCUMENTS 1,864,454 A 6/1932 Macdougall
2,324,685 A * 7/1943 Ingemar ................. A61G 3/006 296/19
4,803,744 A * 2/1989 Peck ..................... A61B 5/1115 5/940
7,621,705 B2 * 11/2009 Hillberry ................. A61G 5/04 410/86
10,245,192 B2 * 4/2019 Burkeen .............. A61G 3/0883
2004/0265084 A1 12/2004 Hillberry et al.
(Continued)

FOREIGN PATENT DOCUMENTS

CA 2346207 A1 * 5/2000

OTHER PUBLICATIONS

PCT International Search Report for International Application No. PCT/IL2020/050489, mailed Jun. 29, 2020, 3pp.
(Continued)

*Primary Examiner* — Amy R Weisberg
*Assistant Examiner* — Sara Laghlam
(74) *Attorney, Agent, or Firm* — The Roy Gross Law Firm, LLC; Roy Gross

(57) ABSTRACT

A shock absorbing apparatus for mitigating agitations while riding within a vehicle. The apparatus is configured to allow a gurney to be connected thereto and further be connected to the floor of an emergency vehicle. The apparatus includes an airbag system that is deflated/inflated by closing/opening the gurney entrance door of the vehicle.

15 Claims, 10 Drawing Sheets

(56) References Cited

U.S. PATENT DOCUMENTS

| | | | | |
|---|---|---|---|---|
| 2012/0144816 | A1* | 6/2012 | Van Dongen | F15B 11/064 60/484 |
| 2013/0133317 | A1 | 5/2013 | Zumbrum | |
| 2015/0233780 | A1 | 8/2015 | Misikir et al. | |
| 2017/0119601 | A1* | 5/2017 | Bennett | A61G 3/0218 |

OTHER PUBLICATIONS

PCT Written Opinion for International Application No. PCT/IL2020/050489, mailed Jun. 29, 2020, 4pp.

PCT International Preliminary Report on Patentability for International Application No. PCT/IL2020/050489, issued Nov. 2, 2021, 5pp.

* cited by examiner

SHOCK ABSORBING APPARATUS

CROSS-REFERENCE TO RELATED APPLICATIONS

This application is a National Phase of PCT Patent Application No. PCT/IL2020/050489 having International filing date of Apr. 30, 2020, which claims the benefit of priority of U.S. Provisional Patent Application No. 62/842,577, filed May 3, 2019, the contents of which are all incorporated herein by reference in their entirety.

FIELD OF THE INVENTION

The invention relates to a vehicle accessory, in particular a shock absorbing apparatus for mitigating agitations when the vehicle is travelling.

BACKGROUND

Emergency vehicles may provide a rough ride when transporting patients. In addition to the possible discomfort and potential negative health effects on an injured person, urgent medical procedures may be required while the vehicle is moving. Among these are several procedures requiring skill and accuracy. Performing these procedures properly may be difficult or even impossible in rough-riding vehicles. Such issues can hamper the chances of saving the patient or at least worsen the outcome.

It is believed that the following publications represent the relevant technology in the field.

CN102336221A discloses a buffering device for buffering a body of a medical ambulance. The anti-vibration buffering device for a medical ambulance comprises a base support plate fixed on a base plate, a horizontal support plate fixed on a horizontal plate and elastic parts arranged at the corner part of two support plates. The anti-vibration buffering device is arranged in six sandwich spaces formed between two plate compartments. All elastic parts in the opposite sandwich spaces lie in the same imaginary plane, and the imaginary plane penetrates through a gravity center of the base plate compartment.

U.S. Pat. No. 7,891,922 discloses a vibration isolator for a container, or the like, and a method of using the same which are applicable to general containers and allow the loaded articles to be protected against vibration at the time of transportation. The vibration isolator provides vibration isolation for cargo protection, being interposed beneath a transport container, a merchandise transport pallet, or the like, wherein shock absorbing members are interposed between a base frame and a load carrying frame; and at least at the four corners of the base frame, a latch receiving structure of a twist lock is disposed, and in the corresponding place in the load carrying frame, a twist lock is disposed.

U.S. Pat. No. 5,109,939 discloses a vibration dampening and shock absorber suspension device for the cab of a truck vehicle having a base member adapted for mounting to the truck frame and an impact plate adapted for attachment to the truck cab. The impact plate has a lateral dimension which is less than the lateral distance between the side beams of the truck frame. Interposed between the base member and the impact plate is a pair of air springs which are maintained at a constant height by a height control valve. A pair of hydraulic shock absorbers is pivotally connected to both the impact plate and base member where the central axis of the shock absorbers forms the opposite sides of a trapezoid.

U.S. Pat. No. 5,218,728 discloses a sleeping bed for a motor vehicle which is effectively isolated from jars and vibrations encountered during highway travel. The bed comprises a movable frame which is supported by inflatable airbags from a stationary frame affixed to the floor of the vehicle. Three position valves control the in-flow and out-flow of air from the air bags. The valve is mechanically coupled by linkages to the movable frame so that its relative displacement controls the pressure within the air bag. The movable frame is supported on pistons of the air bags by first and second slide members which permit longitudinal and transverse horizontal movement of the movable frame. Springs are employed to restore the movable frame to a neutral horizontal position following acceleration/deceleration forces tending to move the movable frame and mattress in the fore and aft direction, and when longitudinal sway forces act on the bed. Effectively coupled in parallel with the air bags and the spring assemblies are hydraulic or air cylinders which function as dampeners to prevent extreme overshoot and/or oscillation of the movable frame following a sudden displacement.

U.S. Pat. No. 8,302,944 discloses an apparatus that prevents a collapse mode and a sling-shot mode of an accumulated air spring vibration isolation system. The apparatus is contained in an air spring which is connected to an accumulator. The apparatus blocks air flow to the accumulator when the air spring is attempting to bottom out, resulting in a soft pneumatic stop for the suspended mass. High pressure air within the air spring at its lowest height is evacuated to the accumulator, thus precluding a "sling shot" reaction of the suspended mass. The apparatus incorporates a double acting air cylinder with an orifice disk attached to a piston shaft end and an orifice contained within the air spring head. The upper air cylinder volume is vented to the air spring interior compartment through an unrestrictive orifice and the lower air cylinder volume is vented to the high-pressure source through a highly restrictive orifice.

U.S. Pat. No. 3,632,077 discloses a variable damping means for cushioning a vehicle occupant from shocks and vibrations transmitted through the vehicle chassis. The occupant support is allowed to oscillate with low damping to provide maximum isolation for the occupant from light vibrations. In addition, the occupant is cushioned with respect to severe shocks by increased damping. The damping characteristics are changed automatically as the character of the shocks and vibrations changes.

SUMMARY OF THE INVENTION

The present invention pertains to an apparatus configured to smooth or damp the ride of a patient lying in a vehicle. The apparatus includes a gurney support and fixing structure and an associated airbag system operable to absorb shocks, vibrations and oscillations associated with transportation of a patient.

In an aspect of the invention, there is provided a shock absorbing apparatus including a gurney support and fixing structure; an airbag system having at least one (typically a plurality) of airbags operable to absorb shocks; and a vehicle attachment mechanism for attaching the apparatus to a vehicle. The apparatus, in particular the airbag system, is configured to be automatically actuated via a gurney entrance door of the vehicle, such that after the airbag system, in particular a door-connector valve thereof, affixed to the door and fluidly or pneumatically connected to the airbag system, the airbag system is automatically activated to inflate the at least one airbag of the airbag system when the door is closed and to automatically deactivate the airbag system so as to deflate the at least one airbag, when the door is opened.

Thus, an aspect of the invention pertains to a shock absorbing apparatus for use with a patient transport vehicle having a gurney entrance door, the apparatus comprising;

a gurney support and fixing structure configured to support a gurney and allow the gurney to be attached thereto;

an airbag system having at least one airbag operable to mitigate shocks;

a pressurized air supply for supplying air to the airbags;

at least one airbag valve respectively coupled to the at least one airbag and configured to control the inflow and outflow of air within the at least one airbag;

one or more pipes for pneumatically connecting the at least one airbag to the pressurized air supply and the at least one airbag valve; and a pressure controller for adjusting the air pressure within the airbag system; and a vehicle attachment mechanism for attaching the gurney support and fixing structure to a floor of said patient transport vehicle; wherein each of the at least one airbag is deflated and inflated independently, in accordance with the weight load applied thereon, to thereby mitigate agitations when the vehicle is travelling.

In one or more embodiments, the airbag system further comprises a gurney entrance door-actuated valve automatically activated by the opening and closing of the gurney entrance door, whereby the airbag system is automatically activated to inflate the at least one airbag of the airbag system when the gurney entrance door is closed and to automatically control the airbag system so as to deflate the at least one airbag, when the gurney entrance door is opened.

In one or more embodiments, the at least one airbag is connected directly to a floor of the vehicle. In one or more embodiments, the at least one airbag is connected indirectly to a floor of the vehicle. In one or more embodiments, the at least one airbag has an associated airbag housing structure for accommodating therein the at least one airbag. In one or more embodiments, the airbag housing structure is configured to be connected to the floor of the vehicle. In one or more embodiments, the airbag housing structure includes an airbag bin. In one or more embodiments, the airbag housing structure includes an airbag tray.

In one or more embodiments, the patient transport vehicle comprises a floor and a floor cover. In one or more embodiments, the floor and a floor cover may be disposed one above the other so as to abut and touch each other. In one or more embodiments, the floor and a floor cover thereof may be spaced apart from each other.

In one or more embodiments, the patient transport vehicle is pre-prepared with floor cut-outs in its floor, and the airbag bins correspond to and fit through the vehicle floor cut-outs, and the bins are connected to the floor of the patient transport vehicle.

In one or more embodiments, the patient transport vehicle is pre-prepared with a floor cover cut-out in its floor cover, and the gurney support and fixing structure correspond to and fit through the vehicle floor cover cut-out, and the trays are connected to the floor of the patient transport vehicle.

In one or more embodiments, the apparatus further comprises an expandable connector configured to provide a vertical degree of freedom between the gurney support and fixing structure and the airbag housing structure. In one or more embodiments, the apparatus further comprises an expandable connector configured to provide a vertical degree of freedom between the gurney support and fixing structure and the floor of the patient transport vehicle. In one or more embodiments, the expandable connector is constituted by invertedly juxtaposed interlocking U-bolts.

In one or more embodiments, the expandable connector is constituted by upper U-shaped member with a bolt opening in a lower portion thereof; and a bolt slidingly receivable in the bolt opening.

In one or more embodiments, the pressurized air supply comprises a compressor. In one or more embodiments, the pressurized air supply comprises an air tank. In one or more embodiments, the airbag system comprises a safety valve configured to deflate the airbags.

In one or more embodiments, the at least one airbag valve comprise a proportional valve, coupled to the at least one airbag and configured to adjust air pressure within the at least one airbag proportional to weight load on said at least one airbag.

In one or more embodiments, the proportional valve is coupled to a pneumatic silencer for slowing air outflow from the at least one airbag.

In one or more embodiments, the apparatus further comprising at least one exhaust valve in pneumatic communication respectively with the at least one airbag, the at least one exhaust valve configured to deflate air from the at least one airbag when the door-actuated valve is activated.

In one or more embodiments, the apparatus further comprising an exhaust valve in pneumatic communication with the at least one airbag, the exhaust valve configured to deflate air from the at least one airbag when the safety valve is activated.

In one or more embodiments, the airbag system is configured so that the at least one airbag is inflated in correspondence with a patient's weight. In one or more embodiments, the airbag system includes two or more airbags. In some embodiments, the airbag system includes three or more airbags, or four or more airbags. In one or more embodiments, the airbag system includes four airbags. In one or more embodiments, each of the four airbags is disposed underneath the gurney support and fixing structure. In one or more embodiments, each of the four airbags is disposed underneath a corner of the gurney support and fixing structure.

In one or more embodiments, the airbags are connectable one to another via one or more air-pipes. In one or more embodiments, the airbag system includes an air compressor and an air tank operable to supply air to the airbags. In one or more embodiments, the airbag system includes one or more valves operable to regulate the pressure of air within the airbags.

In one or more embodiments, the apparatus includes airbags with airbag housing structures (e.g., bins, trays), wherein each airbag housing structure is attached to the gurney support and fixing structure via an expandable connector. In one or more embodiments, the expandable connector connects the gurney support and fixing structure to the floor of the vehicle.

In one or more embodiments, the expandable connector connects the gurney support and fixing structure to the airbag housing and further to the floor of the vehicle.

In an aspect of the invention, there is provided an apparatus for damping shocks while transporting a patient or passenger within a vehicle. The apparatus includes one or more airbags, wherein each of the airbags includes a valve operable to control inflow and out flow of air entering or exiting the airbags in accordance with weight applied on the airbags; an air compressor configured to supply air to the airbags via one or more air-pipes; and one or more valves to control the inflow and out flow of air to the airbags.

In some embodiments, the airbags extend below the floor of the vehicle. In some embodiments, the airbags are connected directly to a floor of the vehicle. In some embodiments, the airbags are connected indirectly to a floor of the vehicle. In some embodiments, the airbags extend below the floor cover of the vehicle.

In some embodiments, the airbags are configured to absorb or damp vertical agitations. In some embodiments, the airbags are configured to absorb or damp horizontal agitations. In some embodiments, the airbags are configured to absorb or damp agitations from various angles. In some embodiments, the airbags are substantially spherical and can damp agitations from various angles. In some embodiments, the airbags have a sleeve/cylindrical-like structure and can damp vertical agitations. The airbags are connected to the gurney support and fixing structure at certain points allowing absorbance of agitations at various angles. In some embodiments the airbags are configured to absorb or damp agitations from angles/directions of about 180°. In some embodiments, the airbags are configured to absorb or damp agitations from angles/directions of about 360°.

In some embodiments, the apparatus includes at least one valve useful for controlling the extent of air-bag inflation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference to the drawings in detail, it is stressed that the shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

Figure 1:
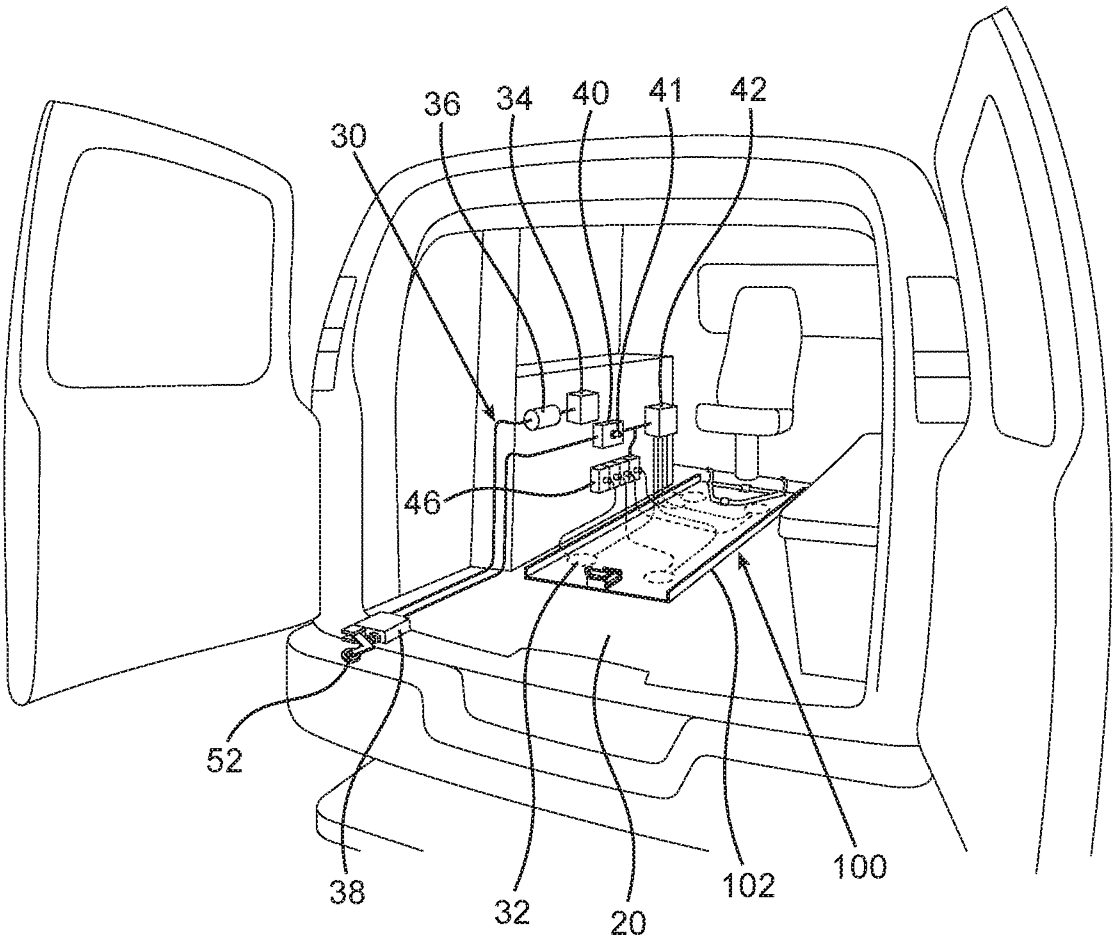
FIG. 1 is a perspective view of a shock absorbing apparatus in accordance with embodiments of the present invention, located within a vehicle.

It is understood that the invention is not limited to the particular methodology, devices, items or products etc., described herein, as these may vary as the skilled artisan will recognize. It is also to be understood that the terminology used herein is used for the purpose of describing particular embodiments only and is not intended to limit the scope of the invention. The following exemplary embodiments may be described in the context of shock absorbing apparatus and portions thereof for ease of description and understanding. However, the invention is not limited to the specifically described products and methods and may be adapted to various applications without departing from the overall scope of the invention.

The present invention pertains to a transportation apparatus that facilitates a smooth ride for subject during transportation in a vehicle, i.e. a shock absorbing apparatus. The apparatus is configured to be assimilated within a vehicle, such as an emergency vehicle (e.g., an ambulance). The apparatus includes an airbag system in order to absorb shocks or vibrations when the vehicle is moving.

The apparatus is advantageously configured to allow mounting thereof within the vehicle, and to integrate with the vehicle and allow the attributes of shock mitigation. Further advantageously, the apparatus includes a smart airbag system that includes a plurality of airbags interconnected via one or more air pipes (herein referred to also as "an air-pipe system") and a plurality of valves that regulate the air pressure within the airbags according to the load applied onto the airbags. The apparatus further advantageously includes a door-actuated valve that is activated to deflate the airbags upon opening the gurney entrance door of the vehicle; and is activated to inflate the airbags upon closing the gurney entrance door of the vehicle. A safety valve coupled to the airbag system further allows deactivation/activation of the airbag system when required.

As used herein the term "shock absorbing" and its derivatives refers to an apparatus, device, fixture, or structure as herein disclosed that can reduce, absorb or eliminate shocks, fluctuations, agitations or oscillations that are commonly associated when riding in a vehicle.

An aspect of the invention pertains to an apparatus for damping shocks experienced by a patient or passenger while being transported in a vehicle, the apparatus comprising one or more airbags wherein each of the airbags is coupled to at least one proportional valve operable to control the inflow and outflow of air within the airbags in accordance with a weight load applied on the airbags;

an air compressor and an air tank configured to supply air within the airbags via one or more air-pipes; and a gurney support and fixing structure connected to the airbags and configured to accommodate a gurney/stretcher or the like.

As used herein the term "airbag" refers to a shock absorber that uses pressurized air as a cushion. The term "airbag" is interchangeable with the terms "air cushion" and "air spring" and refers to an enclosed pocket of air. The airbag may be made of rubber, such as a heavy-duty reinforced rubber, or a durable nylon reinforced rubber "fabric" that is flexible in nature and forms an airtight airbag when inflated. The airbag can be inflated to provide a firm cushion, and then deflated when not in use. When inflated, the airbags allow lifting and load handling capacity. The airbags may have a spherical or a cylindrical-like structure. For example, the airbags may be a sleeve-like type or a bellows-like type.

As used herein the term "patient transport vehicle" and its derivatives includes an emergency vehicle (e.g., an ambulance), or any other vehicle applicable for use in transporting a patient, including without limitation a helicopter, an airplane, a van, or a ship.

The term "patient" and its derivatives will be used herein the specification and claims to indicate any person benefitting from mechanical shock mitigation.

The airbags may be disposed within dedicated housing structures and the structures are optionally connected to the floor of the vehicle. The airbags and/or housing structures therefor may extend below the floor of the vehicle. Alternatively, the airbags and/or housing structures therefor can be disposed above the vehicle floor.

Expandable connectors between the gurney support and fixing structure and the housing structures allow a vertical degree of freedom and the inflation and deflations of the airbags.

The airbags are configured to absorb or damp agitations in various direction. The airbags may absorb or damp vertical agitations. The airbags may absorb or damp horizontal agitations. Optionally, the airbags configured to absorb or damp agitations from 360° angles.

The apparatus includes one or more pipes for supplying air within the airbags and connecting the various components of the airbag system, forming a closed pneumatic circle. The airbag system includes at least one valve. Optionally, the system includes a plurality of valves. For example, the system includes at least three valves, at least four valves, or at least five valves.

The apparatus, and in particular the gurney support and fixing structure, can be coupled to the vehicle such that the gurney support and fixing structure is optionally disposed on top of the floor and/or floor cover of the vehicle or is aligned with the floor and/or floor cover of the vehicle.

Optionally, when the airbag system is active and the airbags are inflated, the gurney support and fixing structure is elevated with respect to the floor and/or floor cover of the vehicle.

Optionally, when the airbag system is non-active and the airbags are deflated, the gurney support and fixing structure is level or aligned with the floor and/or floor cover of the vehicle allowing convenient positioning of a stretcher/gurney within the vehicle. The gurney support and fixing structure can then be elevated when the system is activated again (e.g., when the door of the vehicle closes), and the system is operable to absorb agitations.

Figure 2:
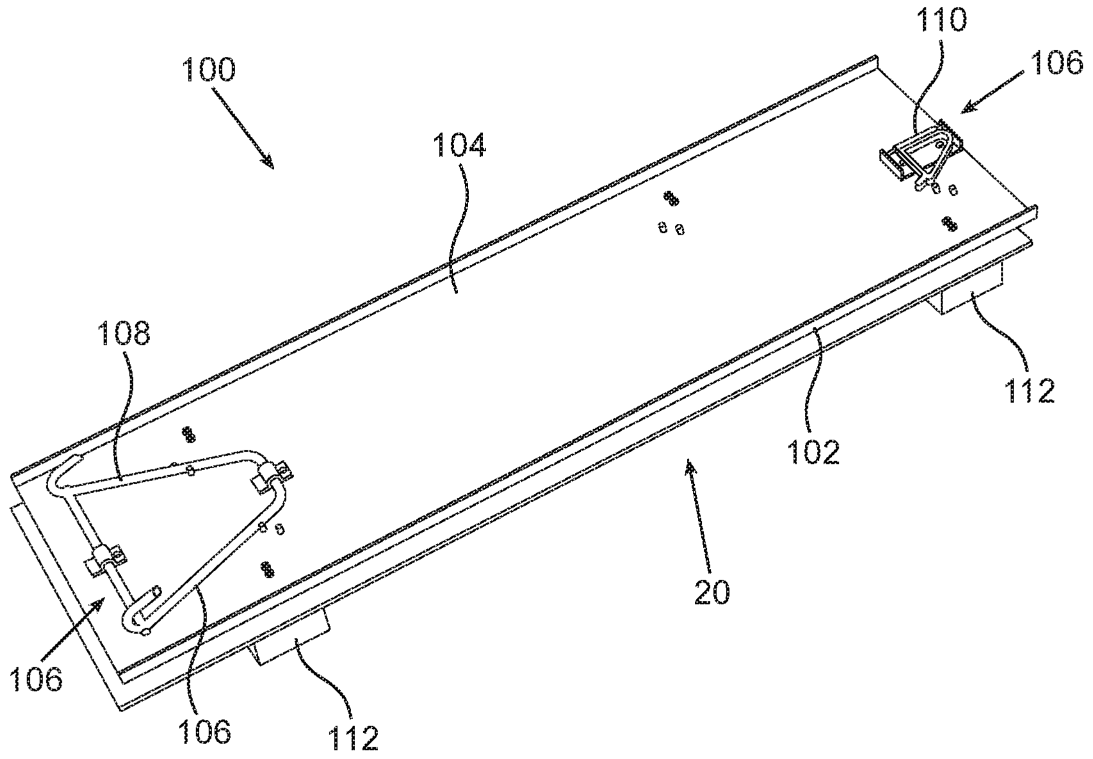
FIGS. 2 and 3 are respective perspective top and bottom views of the shock absorbing apparatus in accordance with embodiments of the present invention, in particular illustrating an exemplary gurney support and fixing structure thereof associated with a vehicle floor.
Figure 3:
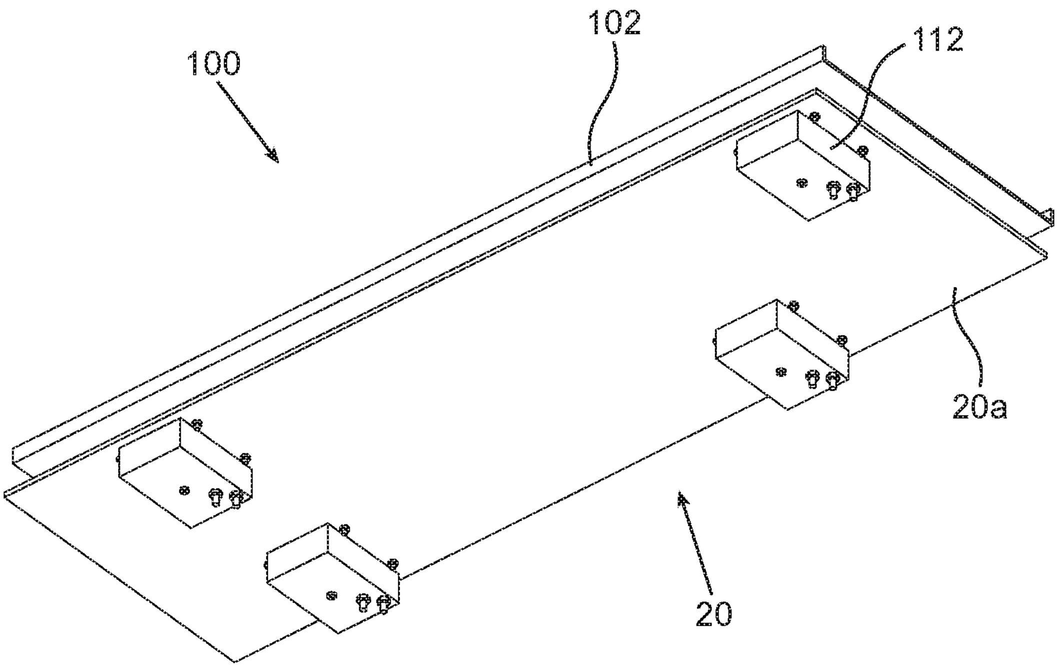
Figure 4:
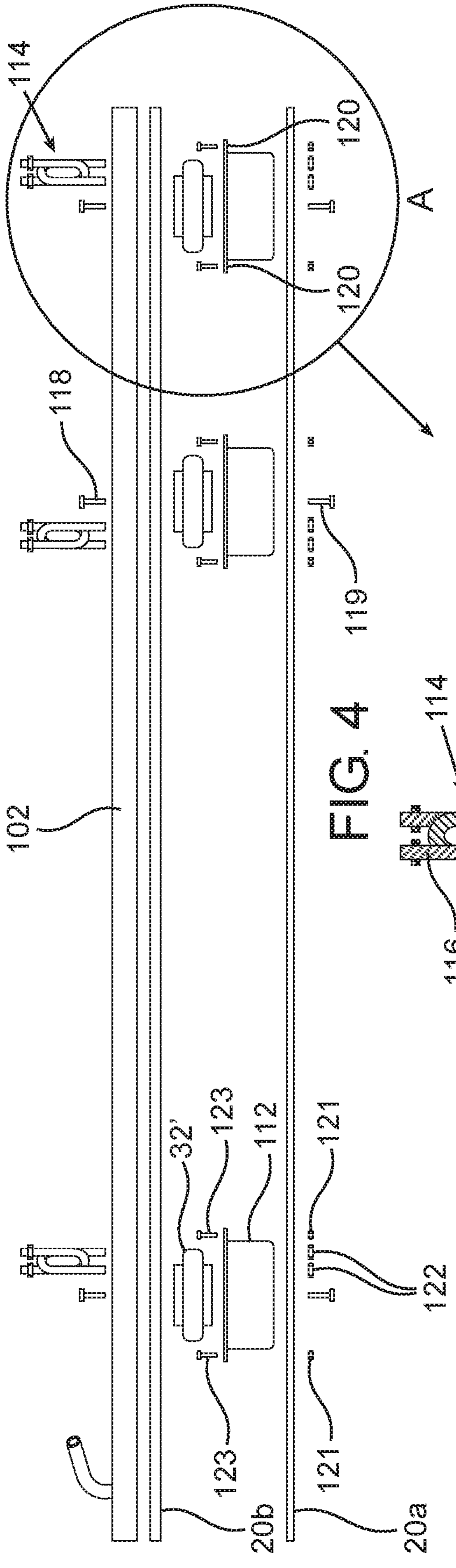
FIG. 4 is an exploded side view of the gurney support and fixing structure including exemplary airbags of the shock absorbing apparatus.
Figure 5:
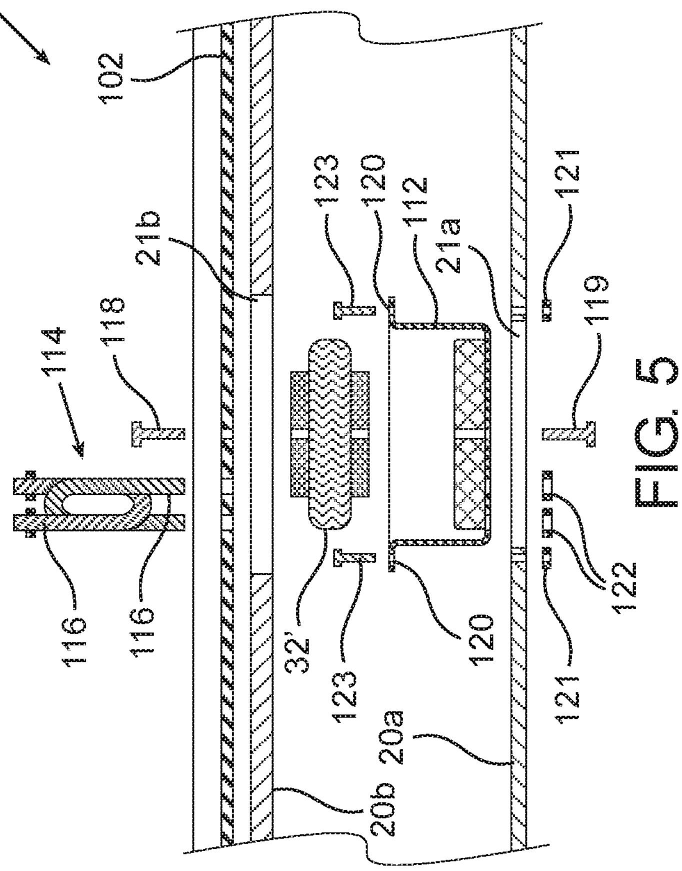
FIG. 5 is a cross-sectional view of detail A of FIG. 4.
Figure 7:
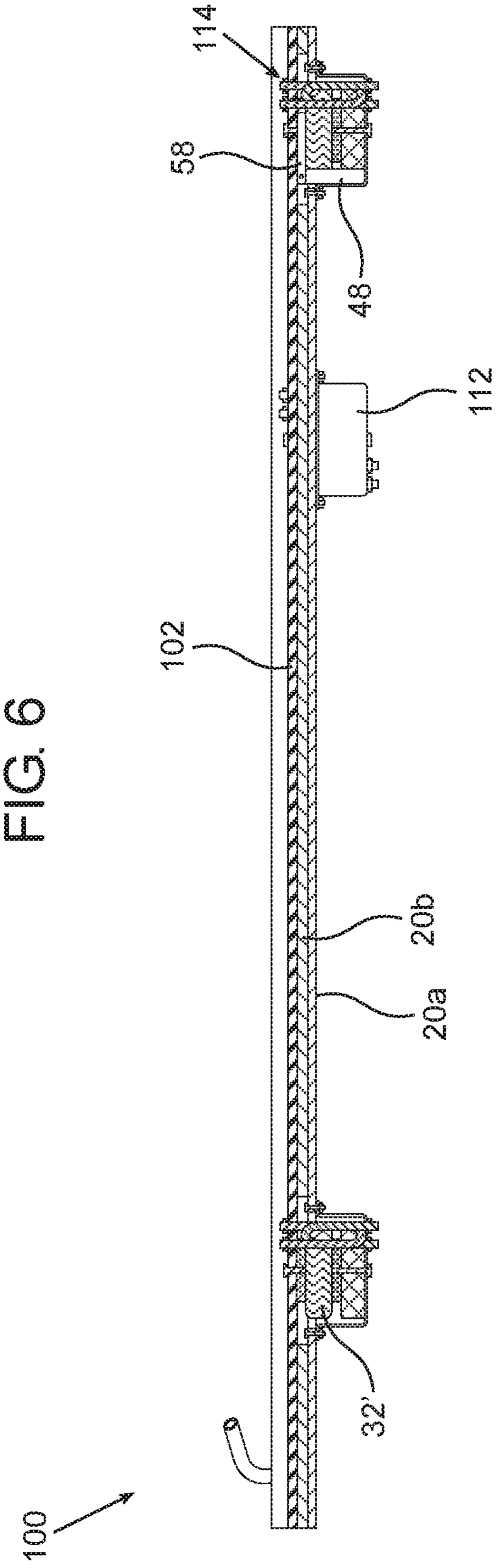
FIG. 7 is a cross-sectional view depicting the apparatus with deflated airbags.
Figure 8:
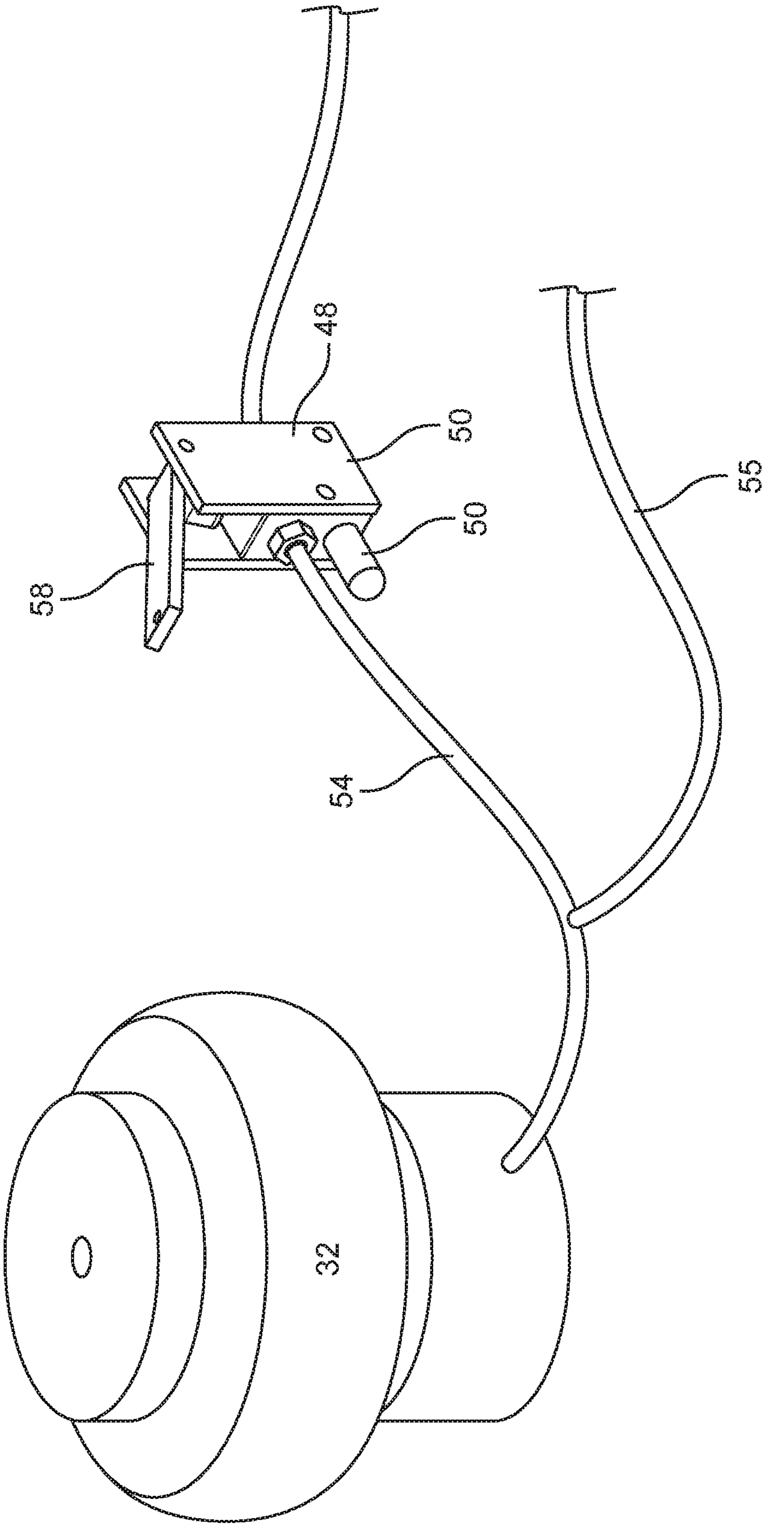
FIG. 8 is a perspective view of an airbag connected to a proportional valve.
Figure 9:
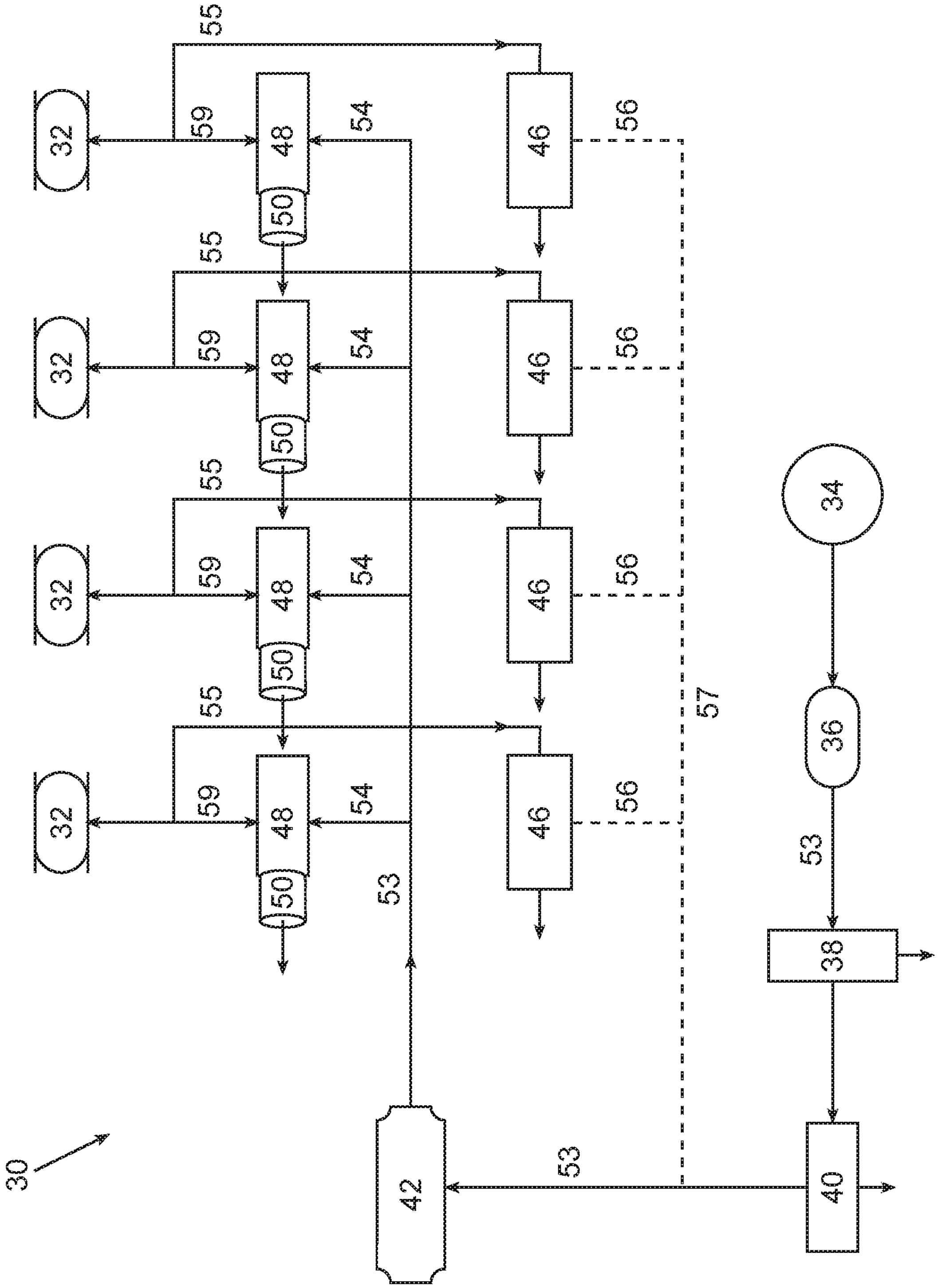
FIG. 9 is a schematic illustration of an exemplary airbag system including an exemplary airbag inflation system therefor, in accordance with embodiments of the present invention.
Figure 10:
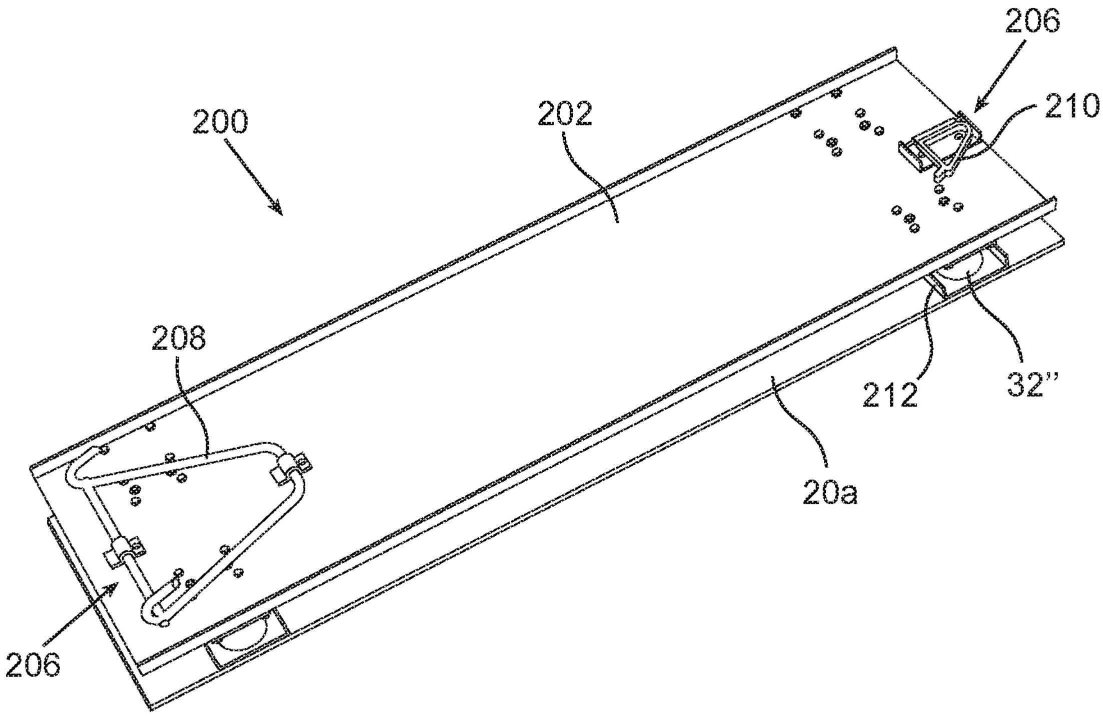
FIG. 10 is a perspective top view of an alternate design of the shock absorbing apparatus connected to a vehicle floor.
Figure 11:
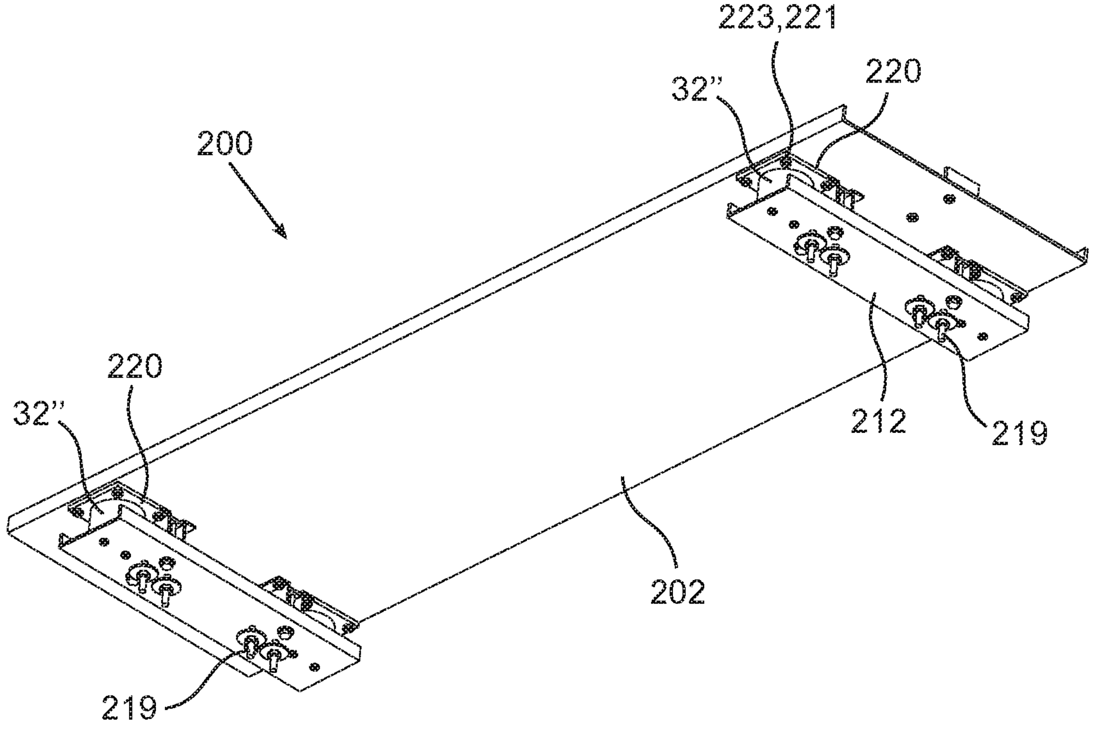
FIG. 11 is a perspective bottom view of the design of the shock absorbing apparatus of FIG. 10.

FIGS. 1-9 show a first exemplary design and implementation of a shock absorbing apparatus 100 including an exemplary gurney support and fixing structure 102; and a schematically depicted airbag system 30 (FIG. 9). Gurney support and fixing structure 102 is designed for assimilation within an emergency vehicle, such as an ambulance (FIG. 1), in particular, mounted or otherwise attached to the vehicle floor 20, which typically has a metal (e.g. aluminum) floor portion 20*a* above which may be an upper floor cover 20*b*, which may be made from wood, fabric, or plastic (FIGS. 4 and 5).

FIG. 1 depicts apparatus 100 which includes airbag system 30. Apparatus 100 includes a gurney support and fixing structure 102 affixed to vehicle floor 20*a* such to minimally occupy a vertical space in the vehicle. Airbag system 30 includes a pressurized air supply comprising an air compressor 34 operable to supply air in the system from an air tank 36, and four airbags 32. Airbag system 30 further includes air pressure controller 42 for adjusting the air pressure in airbag system 30. A door-actuated valve 38 is coupled to the door opening of the ambulance and having a roller lever 52. Door-actuated valve 38 is operable when closing and opening the door of the vehicle such that when the door of the vehicle opens, airbag system 30 releases/deflates air from airbags 32 and gurney support and fixing structure 102 is lowered to allow a stretcher to be inserted within the vehicle and situated on top of the gurney support and fixing structure 102. When the door is closed, door-actuated valve 38 is closed and airbag system 30 is activated to increase air pressure therein and inflate airbags 32. Door-actuated valve 38 is coupled to a door opening of the ambulance such that roller lever 52 abuts and slightly outwardly protrudes from the opening allowing activation of door-actuated valve 38 when the door closes and deactivation thereof when the door is closed. Four exhaust valves 46 allow rapid air release from airbag system 30, and particularly from each of airbags 32, for example in an emergency situation, when a safety valve 40 is operated (for example, via an actuator button 41). As will be described in greater detail below, airbag system 30 is configured to adjust air pressure in each of four airbags 32 individually or at least partially individually and according to the weight load applied on each of airbags 32 during a ride.

Referring now to FIGS. 2-3, gurney support and fixing structure 102 includes a gurney support surface 104 and at least one gurney fixing mechanism 106 to connect a stretcher, gurney, patient bed, or the like thereon. Gurney fixing mechanism 106 includes a fixing connector 108 (illustrated as having a trapezoidal-like configuration) disposed at a first end of gurney support surface 104, and a fixing connector 110 disposed at an opposing second end thereof, to secure a gurney (not shown) to apparatus 100, in particular to structure 102 (best seen in FIG. 2).

It should be understood that the apparatus can be used in conjunction with any vehicle that would benefit from such a shock absorbing apparatus 100, typically a situation involving patients, and the vehicle could be a helicopter, airplane, a van (e.g. for carrying handicapped people in wheelchairs) and the like. Airbags 32' are illustrated by four airbags 32', which are respectively accommodated within dedicated airbag housing structures, in this design, airbag bins 112, which are affixed to vehicle floor 20*a*.

FIGS. 4-5 are exploded views of apparatus 100. In typical ambulance vehicles, vehicle floor 20 may include an upper cover, such as a wooden floor cover portion 20*b* and underneath an aluminum lower floor portion 20*a*. In this design, the vehicle is pre-prepared for attachment of apparatus 100 by having vehicle floor and floor cover cut-outs 21*a* and 21*b* therein corresponding to the respective locations of airbags 32', more particularly, the cut-outs correspond to the locations of airbag bins 112, whereby airbag bins 112 correspond to and fit through the vehicle floor and floor cover cut-outs 21*a* and 21*b*, respectively.

Airbag bins 112 (or any other appropriate portion of apparatus 100) are connected to vehicle floor 20*a* via a vehicle attachment mechanism which may include any manner known per se, including welding, fastening, adhering, screwing means and mechanisms etc. Airbags 32' can be fastened to the gurney support and fixing structure 102, in any manner known, for example by fasteners 118, illustrated by bolts (FIG. 5). Airbags 32' can also be fastened to bins 112, in any manner known, for example by fasteners 119. Airbag bins 112 may have flanges 120 to secure the connection between the airbag bins and vehicle floor portion 20*a* via bolts 123 and nuts 121.

To allow movement of airbags 32' and bins 112 with respect to gurney support and fixing structure 102, airbag bins 112 are attached to structure 102 by an "expandable" connector 114. Various forms of expandable connectors are contemplated and may include inverted juxtaposed interlocking U-bolts 116 (as in FIGS. 4 and 5). U-bolts 116 cross through structure 102 and airbag bins 112 and secured thereto via respective nuts 122.

Figure 6:
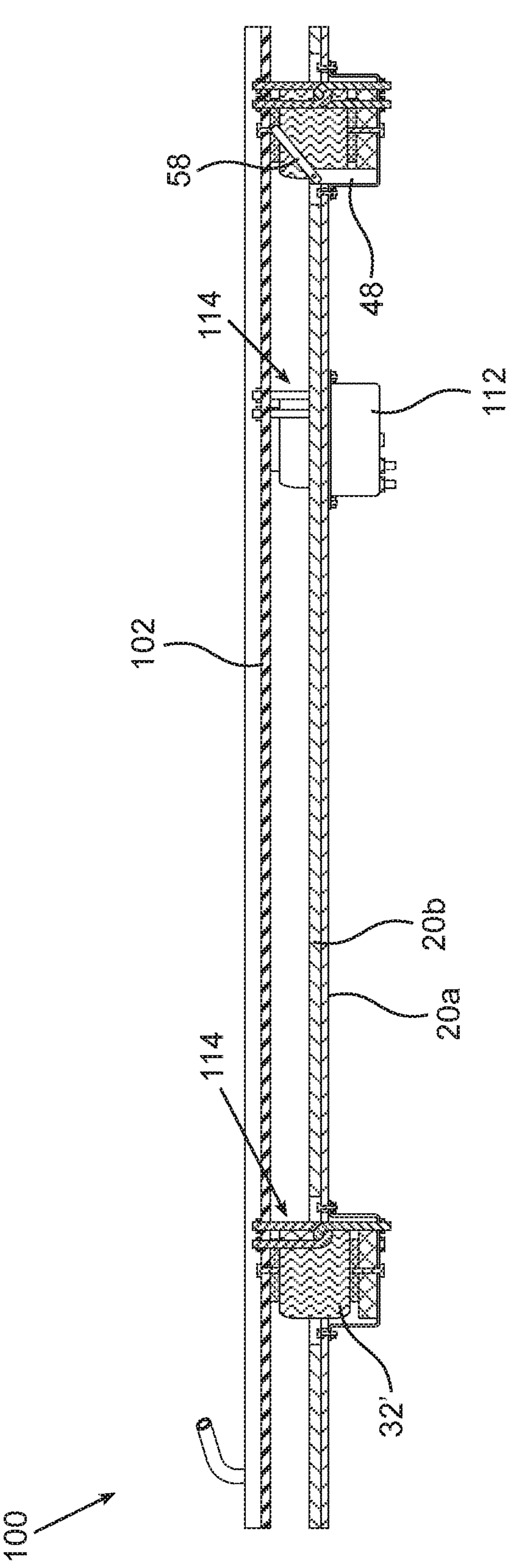
FIG. 6 is a cross-sectional view depicting the apparatus with inflated airbags.

FIGS. 6-7 illustrate that connector 114 is designed to allow a vertical degree of freedom between structure 102 and airbag bins 112 whereby if/when the airbags are inflated beyond the capacity of the bins 112, the airbags can expand outside (above) the bins (FIG. 6); and when the airbags are not inflated, the airbags can contract (including completely contract) and be housed between structure 102 and bins 112 (FIG. 7). Each of airbags 32' is coupled to a proportional valve 48 having a movable lever 58 and airbags 32' are inflated according to the proportional weight load of the patient applied on lever 58, such that when load is applied onto lever 58, the valve 48 will open, allowing air to inflate airbags 32'. In the implementation described in this first design, the shock absorbing apparatus 100 is configured to have a low profile so as to take up minimum vertical space in the vehicle, for example with a floor configuration where floor cover portion 20*b* is close to or touching metal floor portion 20*a*. As such, vehicle floor 20 is pre-prepared for attachment of apparatus 100 by having cut-outs 21*a* and 21*b* therein corresponding to the respective locations of airbags 32', more particularly, the cut-outs correspond to the locations of airbag bins 112, whereby airbag bins 112 correspond to and fit through the vehicle floor cut-outs 21*a* and 21*b*. It is noted that the location of cut-outs 21*a* and 21*b* in vehicle floor 20 can be located with respect to the type of vehicle/ambulance in which apparatus 100 is used (e.g. Chevrolet Savanah). As such, bins 112 may be located as shown in FIG. 2—in other words, not necessarily at corners of the gurney support and fixing structure 102.

It is further noted that the connector 114 may be disposed at various positions in airbag bins 112. For example, the connector 114 may be disposed at the front or back with respect to airbags 32'.

In FIG. 8, proportional valve 48, and airbag 32' are shown individually. Airbag 32' has a spherical structure, but alternative structures are further applicable, such as a sleeve-like structure described herein below with reference to FIGS. 10-16. Valve 48 is coupled to lever 58 via a hinge, which is operable to open the valve 48 when a load is applied to lever 58. Valve 48 is further coupled to a slow-flow air outlet pneumatic silencer 50 that allows a suspended and controlled deflation of air therethrough. A spring (not shown) may be coupled to valve 48 to allow the upward movement of lever 58. An air pipe 54 supplies air within airbag 32' from a pressurized air supply (compressor 34, air tank 36; FIGS. 1 and 9). Airpipe 55 is used for air deflation via exhaust valves 46 (as in FIG. 1). Referring now to FIG. 9, airbag system 30 includes at least one airbag 32, illustrated by four airbags. Airbags 32 can be fed with compressed air by means of the pressurized air supply, such as compressor 34 supplying air to air tank 36; however, in some designs, a pressurized air tank, which can be changed out as required, can be used.

Downstream of the pressurized air supply (compressor 34 and air tank 36), is a door-actuated valve 38 configured to operably connect to the vehicle's gurney entrance door (FIG. 1) such that if the door is open, the door-actuated valve is operable to release air from airbags 32; and if the vehicle door is closed, door-actuated valve 38 is actuated to allow air to flow from the pressurized air supply (e.g. compressor 34 and air tank 36) onward, ultimately to airbags 32. Door actuated valve 38 may be for example a 3/2-way solenoid valve (i.e., includes three-ports, e.g., one for inlet and two for outlet). Activation of door-actuated valve 38 can be achieved, for example, via a roller lever 52 (as in FIG. 1) located near the hinge or opening of vehicle's gurney entrance door, operably connected (e.g. mechanically or electrically) to door-actuated valve 38, so that closing the door will close a circuit and activate (open) door-actuated valve 38. Opening the gurney entrance door, will close door-actuated valve 38.

Downstream of door-actuated valve 38 is safety valve 40, which may be a 3/2-way directional solenoid valve, and which can be actuated via button 41 to deflate airbag system 30 if there is a desire to remove the air in the airbags 32, for example, for treatment of the patient with increased accuracy. Safety valve 40 can be operable to release air from airbag system 30 also when the door of the vehicle is closed. After that is an air-pressure controller 42 comprising relieving air exhaust to set the pressure in airbag system 30 as desired. Downstream of pressure controller 42 are proportional valves 48 (one for each respective airbag 32), which provide air to airbags 32 at a pressure proportional to the load (weight of the patient). Proportional valves 48 include respective slow-flow air outlet pneumatic silencers 50 for controllably allowing air deflation from airbag system 30. There are two ways to remove air from airbag system 30: (1) rapid deflation through exhaust valves 46, when door-actuated valve 38 or safety valve 40 are actuated; and (2) slow and controlled deflation through outlet pneumatic silencers 50 when the system is active.

As illustrated, each airbag 32 is connected to its respective exhaust valve 46, which may be a 3/2-way directional valve. The components in airbag system 30 are connected via dedicated air pipes. For example, air pipes 53 flow air toward airbags 32 and this pipe 53 divides into individual pipes 54, which flow air to airbags 32 via proportional valves 48. Air is controllably released from airbags 32 through pipes 59 via valve 48 and silencer 50. Through air pipes 55, air from airbags 32 can be directed outside of airbag system 30 via exhaust valves 46. Pipes 56 and pipe 57 are used to connect exhaust valves 46 to pipe 53.

FIGS. 9-16 show a second exemplary design for an implementation of a shock absorbing apparatus 200 wherein the apparatus is level with vehicle floor cover 20*b* (not shown), which may be more suitable to certain types of vehicles, for example the Mercedes Sprinter, wherein floor cover portion 20*b* is not close to floor portion 20*a*, but rather those portions are spaced apart from each other. Similarly, to apparatus 100, this design employs airbag system 30 for mitigating agitations.

In this design, instead of airbag bins 112 being disposed within floor cut-outs 21*a*, 21*b*, airbags 32" are connected to vehicle floor portion 20*a* via a housing structure in the form of trays 212, for example a pair of elongated trays (best seen in FIG. 11), each tray supporting a pair of airbags 32". Trays 212 are connected to vehicle floor portion 20*a* by any vehicle attachment mechanism known per se, such as welding, bolts (e.g. bolts 219), etc. In this design, a floor cover cut out in the floor cover portion 20*b* (not shown), having a size that fits to gurney support and fixing structure 202 is made to allow integration of the apparatus with the vehicle and specifically to connect trays 212 to floor 20*a*. When integrated with floor 20*a*, the gurney support and fixing structure 202 is level with floor cover.

Airbags 32" have a cylindrical/sleeve-like structure. Airbags 32" have opposing flanges 220 used to allow connection thereof to gurney support and fixing structure 202 via bolts 223 and nuts 221. It should be understood that trays 212 are merely exemplary and many other housing structures are possible. Alternate tray connection options are also possible, for example, airbags 32" may have lower flanges (e.g., similar to flanges 220) that are fastened or welded directly to vehicle floor portion 20*a*.

Similarly to apparatus 100, gurney support and fixing structure 202 includes at least one gurney fixing mechanism 206 to connect a stretcher, gurney, patient bed, or the alike thereon. Gurney fixing mechanism 206 includes a fixing connector 208 disposed at a first end of gurney support and fixing structure 202, and a fixing connector 210 disposed at an opposing second end thereof, to secure a gurney (not shown) to apparatus 200, in particular to structure 202.

Figure 12:
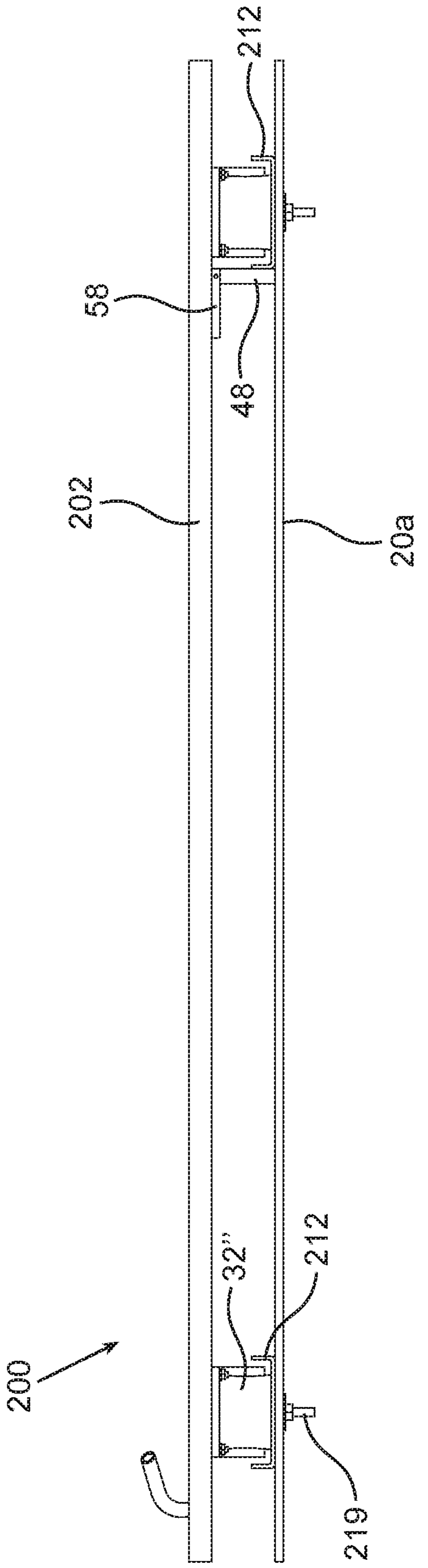
FIG. 12 is a side view of FIG. 10, with the airbags deflated.
Figure 13:
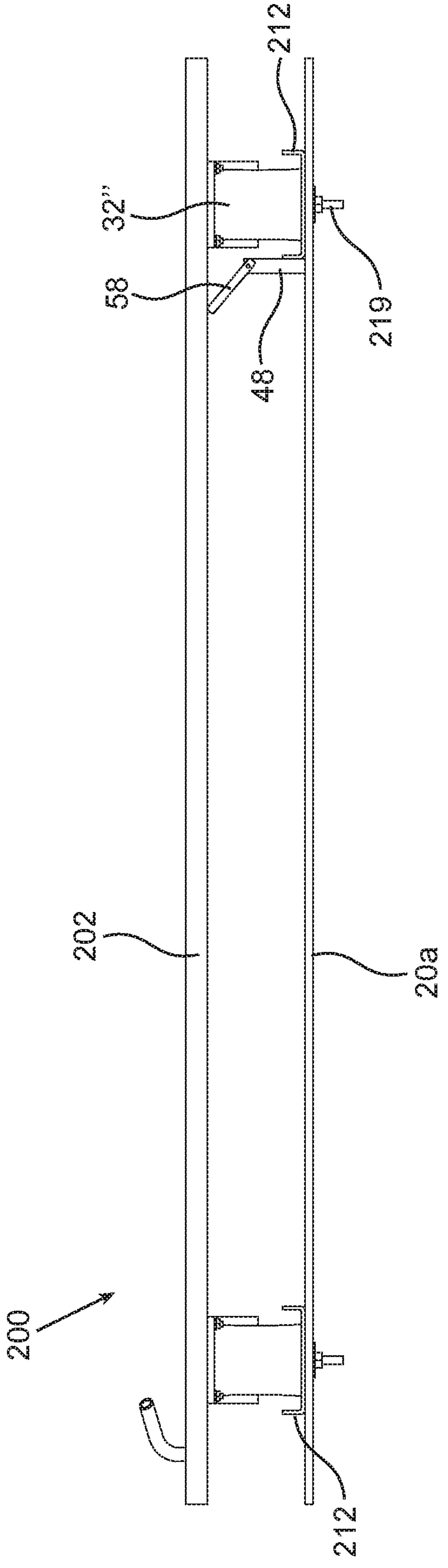
FIG. 13 is a side view of FIG. 10, with the airbags inflated.

FIG. 12 shows airbags 32" when deflated and FIG. 13 shows airbags 32" when inflated. When inflated, the gurney support and fixing structure 202 may be raised with respect to the floor cover 20*b* (not shown) and when deflated, the gurney support and fixing structure 202 is aligned with the floor cover 20*b* (not shown). Proportional valve 48 and lever 58 are pneumatically connected to airbags 32" via pipes 54 and 59 (as in FIG. 9) and when the weight load of the patient is applied on lever 58, the valve 48 will open, allowing air to inflate airbags 32". When the weight load is decreased, or removed, the lever 58 will revert to its initial position and air will deflate from air airbags 32" via valve 48 and silencer 50.

Figure 14:
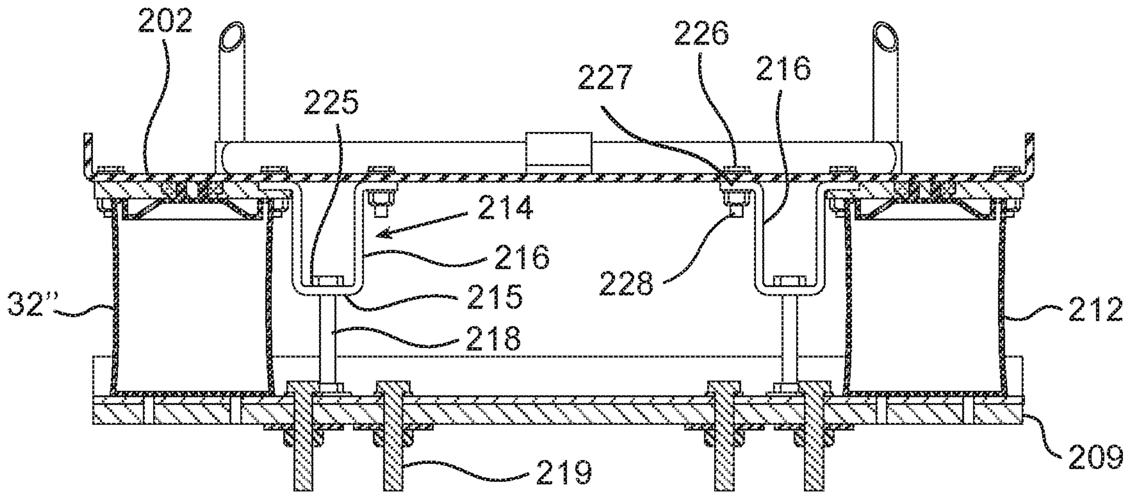
FIG. 14 is a side cross-sectional view of an expandable connector for connecting between the gurney support and fixing structure and the airbag trays, in a position when the airbags are inflated.
Figure 15:
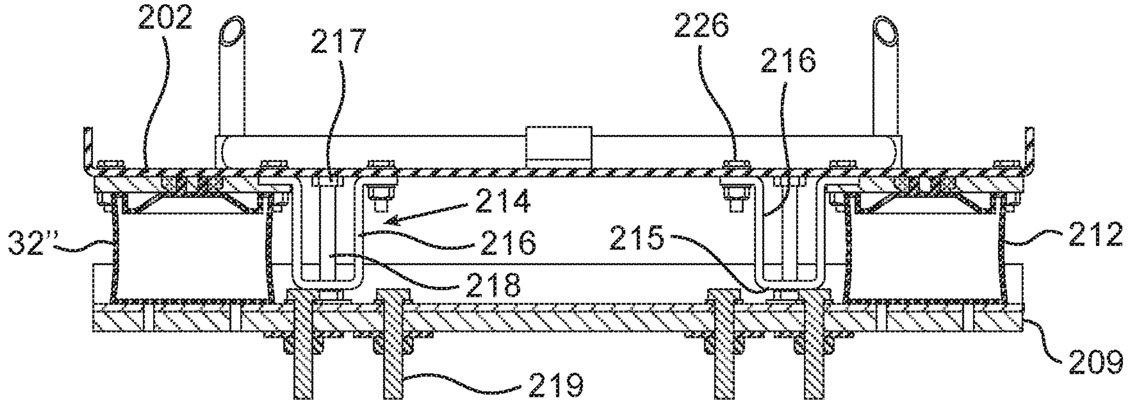
FIG. 15 is a side cross-sectional view depicting the expandable connector for connecting between the gurney support and fixing structure and the airbag trays, in a position when the airbags are deflated.

FIGS. 14 and 15 show an exemplary expandable connector 214 for connecting between gurney support and fixing structure 202 and tray 212, optionally also floor 20*a*. Connector 214 includes an upper U-shaped member 216 with a bolt opening 225 in a lower portion 215 of U-shaped member 216; and a bolt 218 (or the like) slidingly receivable in opening 225 and secured thereto via nut 217. In other words, there is some "play" or tolerance such that bolt 218 can freely move with respect to opening 225. As such, connector 214 has a vertical degree of freedom, i.e. can be in an "expanded" position (FIG. 14) when airbags 32" are not inflated; and can be in a "contracted" position (FIG. 15) when airbags 32" are deflated. Connector 214 may have flanges 227 for securing connection thereof to structure 202 via dedicated bolts 228 and nuts 226. It should be understood that connector 214 can be positioned upside down and the terms "upper" and "lower" are merely relative. It should be further understood that connector 214 can be positioned in various locations with respect to airbags 32", for example in front of or in a rearward location relative to airbags 32"

Figure 16A:
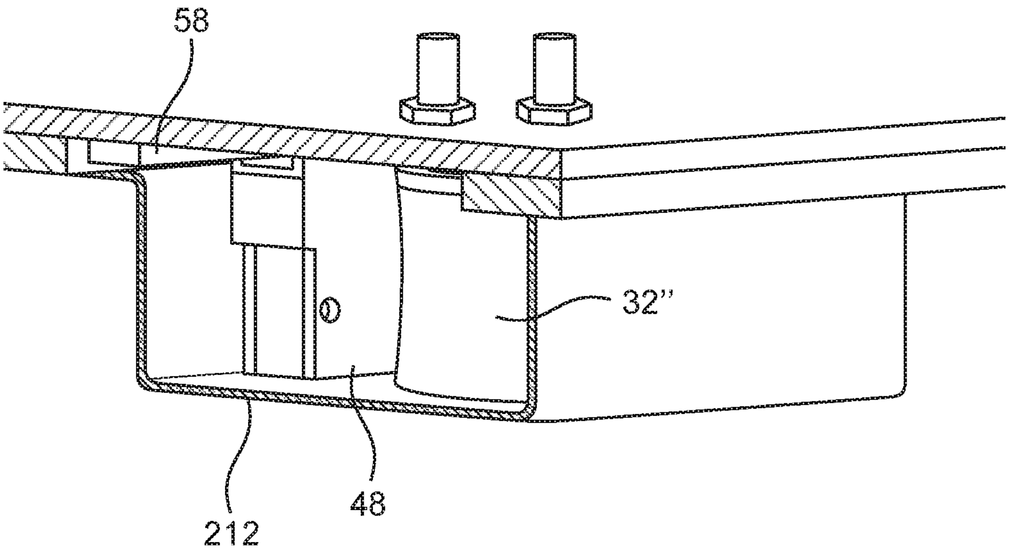
FIGS. 16A-16B are perspective views of the airbag and proportional valve therefor.
Figure 16B:
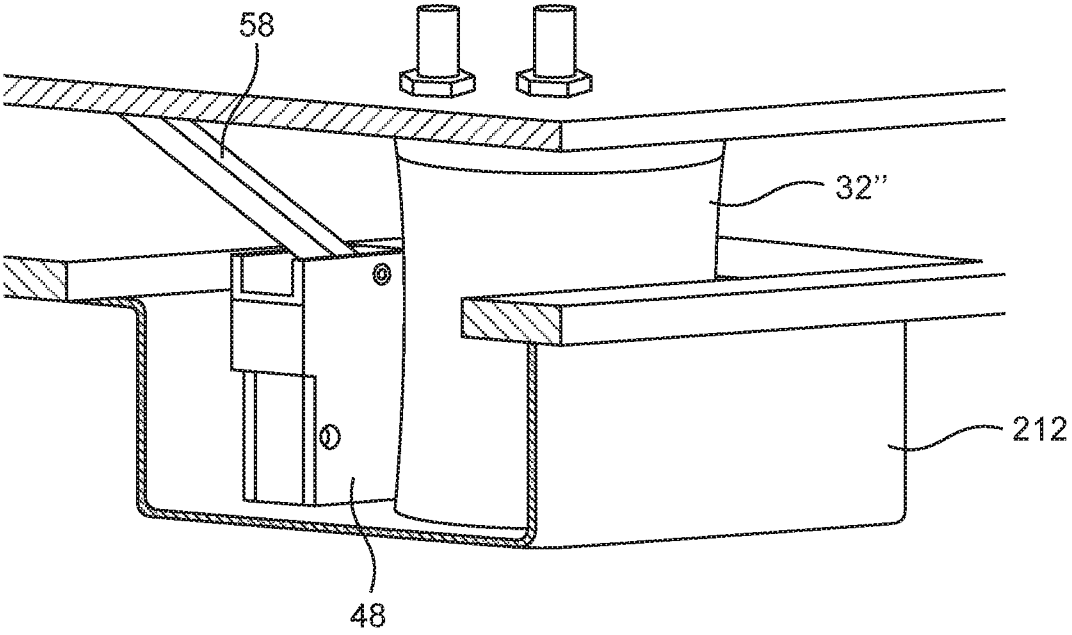

FIGS. 16A-16B illustrate airbags 32" when deflated (FIG. 16A) and inflated (FIG. 16B). The figures illustrate that lever 58 may be disposed such that the raising thereof is directed externally and the hinge connecting the lever 58 to proportional valve 48 is disposed in an innermost position.

Each of the following terms: 'includes', 'including', 'has', 'having', 'comprises', and 'comprising', and their linguistic equivalents, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The term 'consisting essentially of' as used herein means that the scope of the claim is limited to the specified elements and those that do not materially affect the basic and novel characteristic(s) of the claimed device and materials.

Each of the phrases 'consisting of' and 'consists of', as used herein, means 'including and limited to'.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

All ranges disclosed herein include the endpoints. The use of the term "or" shall be construed to mean "and/or" unless the specific context indicates otherwise.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and thus, the two equivalently meaning phrases may be used interchangeably.

The term 'about', is some embodiments, refers to ±30% of the stated numerical value. In further embodiments, the term refers to ±20% of the stated numerical value. In yet further embodiments, the term refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment, may also be illustratively described and presented in the context or format of a plurality of separate embodiments.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the broad scope of the appended claims.

All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A shock absorbing apparatus for use with a patient transport vehicle having a gurney entrance door, the apparatus comprising;

a gurney support and fixing structure configured to support a gurney;

an airbag system having at least one airbag operable to mitigate shocks;

a pressurized air supply for supplying air to the airbags;

at least one airbag valve respectively coupled to the at least one airbag and configured to control the inflow and outflow of air within the at least one airbag;

one or more pipes for pneumatically connecting the at least one airbag to the pressurized air supply and the at least one airbag valve;

a pressure controller for adjusting the air pressure within the airbag system; and a gurney entrance door-actuated valve automatically activated by the opening and closing of the gurney entrance door, whereby the airbag system is automatically activated to inflate the at least one airbag of the airbag system when the gurney entrance door is closed and to automatically control the airbag system so as to deflate the at least one airbag, when the gurney entrance door is opened, and a vehicle attachment mechanism for attaching the gurney support and fixing structure to a floor of said patient transport vehicle; wherein each of the at least one airbag is deflated and inflated independently, in accordance with the weight load applied thereon, to thereby mitigate agitations when the vehicle is travelling.

2. The apparatus of claim 1, wherein one or more of the at least one airbag has an associated airbag housing structure for accommodating therein the at least one airbag.

3. The apparatus of claim 2, wherein the airbag housing structure includes an airbag bin.

4. The apparatus of claim 2, wherein the airbag housing structure includes an airbag tray.

5. The apparatus of claim 3, wherein the patient transport vehicle is pre-prepared with at least one vehicle floor cut-out in its floor, and the at least one airbag bin corresponds to and fits through the at least one vehicle floor cut-out, and the at least one airbag bin is connected to the floor of the patient transport vehicle.

6. The apparatus of claim 1, further comprising an expandable connector configured to provide a vertical degree of freedom between the gurney support and fixing structure and the airbag housing structure.

7. The apparatus of claim 6, wherein the expandable connector is constituted by invertedly juxtaposed interlocking U-bolts.

8. The apparatus of claim 6, wherein the expandable connector is constituted by upper U-shaped member with a bolt opening in a lower portion thereof; and a bolt slidingly receivable in the bolt opening.

9. The apparatus of claim 1, wherein the pressurized air supply comprises a compressor.

10. The apparatus of claim 1, wherein the pressurized air supply comprises an air tank.

11. The apparatus of claim 1, wherein the airbag system comprises a safety valve configured to deflate the at least one airbags.

12. The apparatus of claim 1, wherein the at least one airbag valve comprises a proportional valve, coupled to the at least one airbag and configured to adjust air pressure within the at least one airbag proportional to weight load on said at least one airbag.

13. The apparatus of claim 12, wherein the proportional valve is coupled to a pneumatic silencer for slowing air outflow from the at least one airbag.

14. The apparatus of claim 1, further comprising at least one exhaust valve in pneumatic communication respectively with the at least one airbag, the at least one exhaust valve configured to deflate air from the at least one airbag when the door-actuated valve is activated.

15. The apparatus of claim 11, further comprising at least one exhaust valve in pneumatic communication respectively with the at least one airbag, the exhaust valve configured to deflate air from the at least one airbag when the safety valve is activated.

* * * * *